F. A. RYTHER.
HAY PRESS.
APPLICATION FILED JULY 11, 1908.
915,117.
Patented Mar. 16, 1909.
2 SHEETS—SHEET 1.
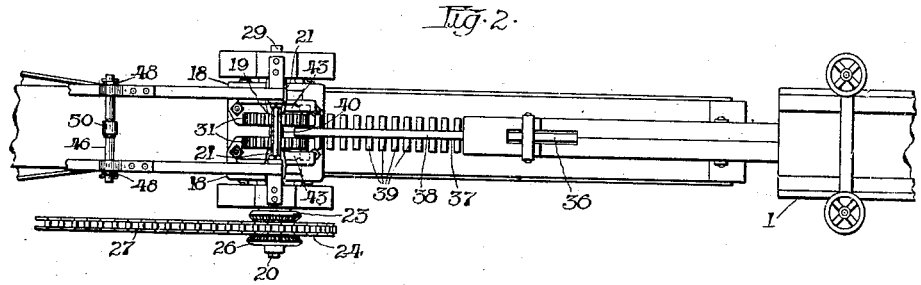
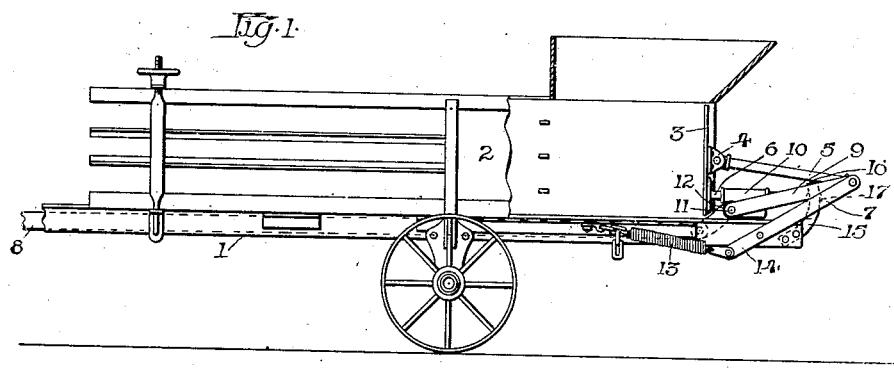
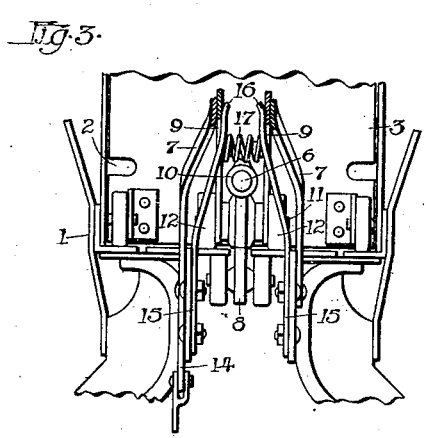
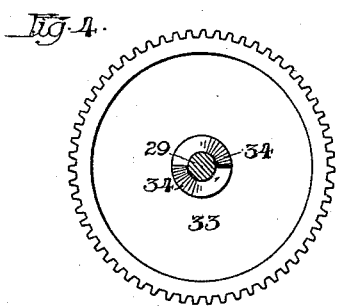
Witnesses:
Inventor:
Frank A. Ryther
By ⏤ Burgess
Attorney F. A. RYTHER.
HAY PRESS.
APPLICATION FILED JULY 11, 1908.
915,117.
Patented Mar. 16, 1909.
2 SHEETS—SHEET 2.
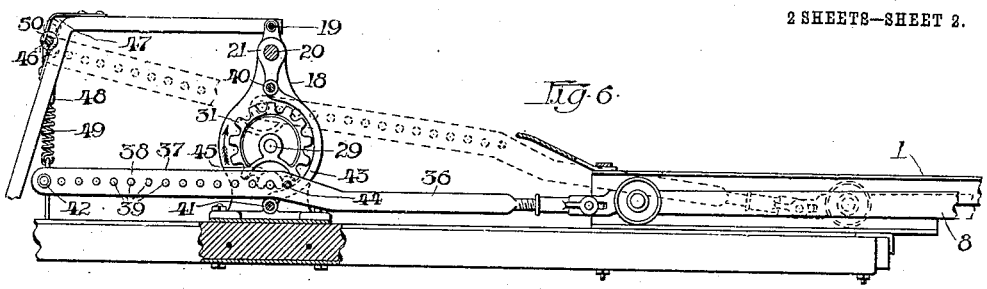
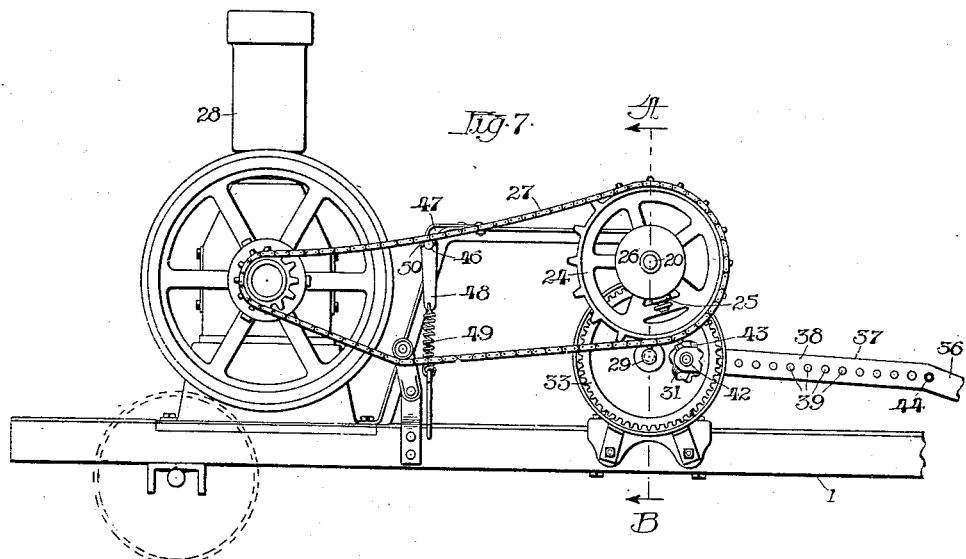
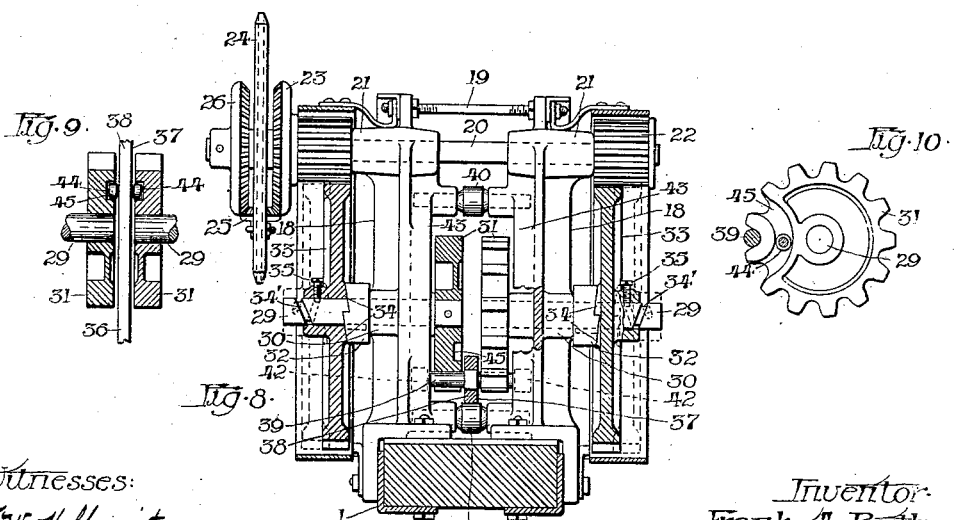
Witnesses:
F. W. Hoffmeister
W. M. Hofjerk
Inventor
Frank A. Ryther
By E. W. Burgess
Attorney

UNITED STATES PATENT OFFICE.

FRANK A. RYTHER, OF CHICAGO, ILLINOIS, ASSIGNOR TO INTERNATIONAL HARVESTER COMPANY, A CORPORATION OF NEW JERSEY.

HAY-PRESS.

No. 915,117.     Specification of Letters Patent.     Patented March 16, 1909.

Application filed July 11, 1908. Serial No. 443,080.

*To all whom it may concern:*

Be it known that I, FRANK A. RYTHER, a citizen of the United States, residing at Chicago, in the county of Cook and State of Illinois, have invented certain new and useful Improvements in Hay-Presses, of which the following is a specification.

My invention relates to hay presses, its object being to provide an improved form of power transmitting mechanism applicable, in particular, to machines of the class that have what are commonly known as rebounding plungers forming a part thereof. I attain this object by the mechanism illustrated in the accompanying drawings, in which—

Figure 1 is a side elevation of the rear end of a hay press embodying my invention. Fig. 2 is a plan view of a part of the power transmitting mechanism. Fig. 3 is a fragmentary end view, partly in section, of Fig. 1. Fig. 4 is a detail of one of the power transmitting elements. Fig. 5 is an end elevation of one of the clutch members of the power transmitting mechanism. Fig. 6 is a sectional side elevation of a portion of the press designed to illustrate the manner of connecting the pull bar of the press mechanism with the power transmitting means. Fig. 7 is a side elevation of the forward end of the press frame having a motor mounted thereon and connected with the press actuating mechanism. Fig. 8 is an enlarged cross section of Fig. 7 along the line A—B. Fig. 9 is a detail cross section of a part of the plunger operating mechanism; and Fig. 10 is a plan view of one of the power transmitting pinions.

Like reference numerals represent the same parts throughout the several views.

Referring to the drawings, 1 designates the frame of the press, 2 the bale chamber, 3 the presser head consisting of a single flat plate having secured to its central portion a pair of ears 4, between which is pivotally connected one end of a toggle member 5.

6 represents a rearwardly projecting stem secured to the bottom edge of the plate.

7 represents toggle members having one end pivotally connected with the press frame and their opposite ends with the outer end of the member 5. A pull bar 8 extends forwardly beneath the press frame and is connected with the toggle members 5 and 7 by means of links 9, spaced apart as shown in Fig. 3. The rear end of the pull bar 8 is bent upward, and 10 represents a sleeve pivotally connected therewith by means of a transverse pin 11, that also connects the links 9 with the sleeve.

12 designates rollers journaled upon opposite ends of the pin and designed to roll upon members of the press frame. The pull bar, when moving in a direction to press the material within the bale chamber, actuates the presser head through the toggle connections therewith, and the bar 7 and links 9 swing through the bale chamber in vertical planes. When the presser head has reached the limit of its pressing movement the elasticity of the bale causes it to rebound in an opposite direction and the parts assume the position shown in Fig. 1, and to assist in returning the head to its initial position there is provided a tension spring 13, having one end adjustably connected with the press frame and its opposite end with a downwardly extended portion 14 of one of the toggle members 7.

In the operation of the press it is desirable that, when the presser head has reached the limit of its rebounding or return movement, it may be held yieldingly against a tendency to rebound slightly in an opposite direction, and also to provide a cushioning resistance against a too violent return thereof to its initial position. To effect this result there is provided a pair of vertically arranged flexible bars 15, secured at their lower ends to the press frame and having oppositely curved portions 16 at their upper ends which are adapted to frictionally engage the inner opposing surfaces of the links 9 as they reach the limit of return movement; and 17 designates an expansion spring interposed between the two bars, near their upper ends, for the purpose of increasing the frictional resistance of the associated parts.

Mounted upon the press frame, in rear of the bale chamber, is the power transmitting mechanism, including vertical frame members 18, having their lower ends secured to the press frame and their upper ends connected by means of a transverse tie rod 19. The power transmitting shaft 20 is journaled in bearings 21 at the upper ends of the vertical frame members and having a pinion 22 secured to one end thereof, and a combined pinion and bevel wheel 23 loosely mounted upon the opposite end of said shaft, and loosely mounted upon the shaft, adjacent said bevel wheel, is a power transmitting member 24, having a bevel pinion 25 carried thereby, which pinion engages with the bevel wheel 23 upon one side of member 24, and also with bevel wheel 26 upon its opposite side that is secured to the power transmitting shaft 20, the whole operating in a well-known manner as a differential driving connection between the two pinions 22 and 23. Power is communicated to member 24 by means of a sprocket chain 27, which is operatively connected with an engine 28 mounted upon the press frame.

29 designates two shafts journaled in axial alinement in transverse bearings 30 intermediate the ends of the vertical frame members, and secured to their inner ends are power transmitting pinions 31 spaced apart as shown in Fig. 8.

32 designates clutch members secured to the shafts 29 upon opposite sides of the power frame and adjacent the outer ends of the bearings for the shafts, and 33 designates power transmitting gear wheels loosely journaled upon the outer ends of the shafts and engaging with pinions 22 and 23 mounted upon the shaft 20 and having their hub portions provided with complemental clutch members 34 adapted to engage with the clutch members 32. The wheels 33 are movable longitudinally upon their respective shafts in a manner to cause the clutch members to engage or disengage, and such movement is effected by means of spirally arranged cam grooves $34^1$ encircling the shafts and having adjustable pins 35 forming part of the hubs of the wheels, said pins having their inner ends received by the cam grooves and operative to cause the wheels to move inward toward the fixed clutch members when they are rotated faster than the shafts 29, and to move outwardly and away from said clutch members when said shafts are caused to rotate faster than said wheels.

36 designates a bar pivotally connected at one end with the pull bar 8, and provided at its opposite end with a rack portion 37, the rack portion including a central vertical web 38, having laterally projecting teeth 39 upon opposite sides thereof adapted to engage with the power transmitting pinions 31 in a manner to cause said rack to move in an orbital path around said pinion, with its web portion passing through the space between them, the rack being held in engagement with the pinions by means of bearing rollers 40 and 41 journaled upon cross shafts supported by the frame members below and above the axis of said pinions, respectively; and 42 designates rollers journaled upon the extended ends of the teeth at the outer end of the rack portion and designed to engage with track portions 43 formed in the vertical frame members and arranged concentric with the axis of the pinions 31, the function of the track being to guide the rack from its upper to its lower path of movement at the beginning of its compression movement, as shown in Figs. 7 and 8; and 44 designate controlling rollers journaled upon studs projecting laterally from the web of the rack at its inner end, which rollers are received by curved tracks 45 formed upon the inner vertical faces of the pinions 31, the function of the associated parts being to lift and guide the rack from its lower to its upper path of movement at the end of the compression movement. When the rack has reached the end of its compression movement and the curved tracks in the pinion have engaged with the controlling rollers 44, causing the rack to move upward in its path of movement, the combined force of the elasticity of the bale against the presser head and the tension of the spring 13 causes the rack to suddenly move from near the limit of its stroke in one direction to near its limit in an opposite direction, as shown by full and dotted lines in Fig. 6, and the rapidity of the rebounding stroke of the rack will cause it to rotate the pinions 31 with greater speed than they are normally rotated by the gear wheels 33, consequently the shafts 29 will rotate faster than the gear wheels loosely mounted thereon, and the cam grooves $34^1$ carried by the shafts will operate upon their connections with the wheel hubs to move said wheels longitudinally along the shafts and thereby separate the clutch members, and the rack and presser head with which it is connected will remain at rest until the gear wheels in their rotative movement have caused, through their pin connection with the cam grooves, the clutch members to reëngage. When the presser head rebounds the rack at its rear end is thrown violently upward, and if no preventive means were present the web portion thereof would strike the upper guide roller 41 with a force that would soon become destructive in a continuous operation of the machine. To prevent such injurious effect there is provided a cushioning mechanism that gradually diminishes the force of the movement of the rack, and it is thereby caused to engage with the roller in a more satisfactory manner.

The mechanism includes a bail-like member 46 arranged transversely across the rear end of the press frame and received by elongated openings 47 in said frame.

48 designates depending arms at opposite ends of the member 46 that are connected with the frame of the machine by means of tension springs 49.

The roller 50 is journaled upon the member 46 intermediate its ends and in position to engage with the web portion of the rack as it moves upward, the member 46 yielding upwardly against the tension of the spring.

What I claim as my invention, and desire to secure by Letters Patent, is:

1. A hay press having, in combination, a bale chamber, a presser head, a rack connected with said presser head, a pinion engaging with said rack, said rack having an orbital movement around said pinion, and a curved track forming part of said pinion and operative to move said rack from side to side of the axis thereof.

2. A hay press having, in combination, a bale chamber, a presser head, a rack connected with said presser head, a pinion engaging with said rack, said rack having an orbital movement around said pinion, a curved track forming part of said pinion, a laterally projecting stud forming part of said rack and adapted to engage with said track in a manner to move said rack from side to side of the axis of said pinion.

3. A hay press having, in combination, a bale chamber, a presser head, a rack connected with said presser head, said rack comprising a central web having laterally projecting teeth upon opposite sides thereof, a pair of axially alined pinions engaging with the toothed portions of said rack, said rack having an orbital movement around said pinions, with its web portion moving between them, laterally projecting studs upon opposite sides of the central web said pinions having curved track portions adapted to engage with said studs in a manner to move said rack from side to side of the axis of said pinions.

4. A hay press having, in combination, a bale chamber, a presser head, a rack connected with said presser head, a power driven pinion engaging with said rack, said rack having an orbital movement around said pinion, means for transmitting power to said pinion, said means including a shaft journaled upon the frame of the machine and having said pinion secured to one end thereof, a clutch member secured to said shaft, a rotative power transmitting member loosely journaled upon said shaft and having a clutch member adapted to engage with said first mentioned clutch member, means for moving said power transmitting member longitudinally upon said shaft in a manner to engage or disengage said clutch members, said means including a spirally arranged cam forming part of said shaft and having a part of said power transmitting member engaging with said cam.

5. A hay press having, in combination, a bale chamber, a presser head, a rack connected with said presser head, a power driven pinion engaging with said rack, said rack having an orbital movement around said pinion, means for transmitting power to said pinion, said means including a shaft journaled upon the frame of the machine and having said pinion secured to one end thereof, a clutch member secured to said shaft, a rotative power transmitting member loosely journaled upon said shaft and having a clutch member adapted to engage with said first mentioned clutch member, means for moving said power transmitting member longitudinally upon said shaft in a manner to engage or disengage said clutch members, said means including a spirally arranged groove formed in said shaft, and a pin in the hub of said power transmitting member having its inner end received by said groove.

6. A hay press having, in combination, a bale chamber, a presser head, a rack connected with said presser head, said rack comprising a central web having laterally projecting teeth upon opposite sides thereof, a pair of axially alined shafts transversely journaled upon the frame of the machine, pinions secured to the inner ends of said shafts and engaging with the toothed portions of said rack, said rack having an orbital movement around said pinions, with its web portion moving between them, power transmitting members loosely journaled upon said shafts and having clutch members carried thereby, complemental clutch members secured to said shaft and adapted to engage with said first mentioned clutch members, and means for moving said power transmitting members longitudinally upon said shafts in a manner to engage or disengage said clutch members, said means including spirally arranged cams forming parts of said shafts, and a part of said power transmitting members engaging with said cams.

7. A hay press having, in combination, a bale chamber, a presser head, a pull bar connected with said presser head, a rack having one end pivotally connected with the opposite end of the said pull bar, a power transmitting pinion engaging with the opposite end of said rack in a manner permitting orbital movement thereof around said pinion, a transverse shaft journaled upon the machine frame and having said pinion secured to one end thereof, a clutch member secured to said shaft, a power transmitting member loosely journaled upon said shaft adjacent said clutch member and movable longitudinally thereon, a complemental clutch member forming part of said power transmitting member, said clutch member being operative when in engagement to positively rotate said shaft in one direction, and means for moving said power transmitting member longitudinally in an opposite direction to cause engagement or disengagement of said clutch members, said means being controlled by the rotation of said transverse shaft in either direction.

8. A hay press having, in combination, a bale chamber, a presser head, a pull bar connected with said presser head, a rack having one end pivotally connected with the opposite end of said pull bar, said rack including a central web having laterally projecting teeth upon opposite sides thereof, a pair of axially alined transverse shafts journaled upon the frame of the machine, pinions secured to the inner ends of said shafts and engaging with the toothed portions of said rack, said rack having an orbital movement around said pinions, with its web portion moving between them, clutch members secured to each of said shafts, power transmitting members loosely journaled upon said shafts adjacent said clutch members and movable longitudinally thereon, complemental clutch members forming part of said power transmitting members, said clutch members being operative when in engagement to positively rotate said pinions in one direction, and means for moving said power transmitting members longitudinally upon their respective shafts in opposite directions to cause engagement or disengagement of said clutch members, said means being controlled by the rotation of said shafts in either direction.

9. A hay press having, in combination, a horizontal bed frame, a bale chamber located at one end of said frame, a presser head adapted to have reciprocatory movement within said chamber, a pull bar having one end connected with said presser head, a rack having one end pivotally connected with the opposite end of said pull bar, said rack including a central web having laterally projecting teeth upon opposite sides thereof, vertically arranged power frame members secured to said bed frame, transverse axially alined shafts journaled in said vertical frame members, pinions secured to the inner ends of said shafts and engaging with the toothed portions of said rack, said rack having an orbital movement around said pinions, with its web portion moving between them, clutch members secured to said shafts near their opposite ends, gear wheels loosely journaled upon the outer ends of said shafts and having clutch members adapted to engage with said first mentioned clutch members, a transverse shaft journaled in said vertical frame members and having a pinion secured thereto engaging with one of said gear wheels, a pinion loosely mounted upon said shaft and engaging with the other gear wheel, a power transmitting member loosely journaled upon the shaft and having a differential driving connection with said shaft and said loosely mounted pinion.

10. A hay press having, in combination, a bale chamber, a presser head, a rack connected with said presser head, a pinion engaging with said rack, said rack having an orbital movement around said pinion, and a yielding contact member mounted upon a fixed part of the machine and adapted to engage with said rack during a part of its movement.

11. A hay press having, in combination, a bale chamber, a presser head, a rack connected with said presser head, a pinion engaging with said rack, said rack having an orbital movement around said pinion, guide rollers adapted to retain said rack and pinion in engagement, and a buffer mechanism adapted to cushion the stroke of said rack as it approaches one of said guide rollers.

FRANK A. RYTHER.

Witnesses:
E. J. TEUFEL,
CHRIS BORG.